United States Patent [19]

Okamura

[11] Patent Number: 5,713,426
[45] Date of Patent: Feb. 3, 1998

[54] HYBRID VEHICLE

[75] Inventor: Michio Okamura, Kanagawa, Japan

[73] Assignee: JEOL Ltd., Japan

[21] Appl. No.: 616,468

[22] Filed: Mar. 19, 1996

[51] Int. Cl.$^6$ .................................. B60K 1/00; B60L 11/02
[52] U.S. Cl. ........................ 180/65.3; 318/139; 318/268; 180/65.4
[58] Field of Search ................................. 180/65.3, 65.4, 180/65.2, 65.8; 318/139, 268

[56] References Cited

U.S. PATENT DOCUMENTS

| 5,310,016 | 5/1994 | Rudelle | 180/65.4 X |
| 5,368,116 | 11/1994 | Iijima et al. | 180/65.4 |
| 5,469,816 | 11/1995 | Murauawa et al. | 180/65.4 X |
| 5,528,121 | 6/1996 | Okamura | 320/1 |
| 5,545,933 | 8/1996 | Okamura et al. | 307/109 |

OTHER PUBLICATIONS

"Hybrid Fuel Cell Battery City Bus Technology Demonstration Project", J. P. Cornu et al., *Proceedings of the 12th International Electric Vehicle Symposium*, vol. 1, pp. 91–99, 1994.

Primary Examiner—Josie Ballato
Attorney, Agent, or Firm—Webb Ziesenheim Bruening Logsdon Orkin & Hanson, P.C.

[57] ABSTRACT

A practical hybrid vehicle comprising an internal combustion engine, a generator powered by the engine, and a storage battery which has a large capacity but is not heavy. The storage battery consists of electric double layer capacitors. Electric power generated by the generator is supplied to the battery via a charger having a constant-current characteristic to recharge the battery. The charger can consist mainly of a current-output type switching regulator. Electric power stored in the battery is supplied via an output converter to an electric motor which drives the wheels.

17 Claims, 2 Drawing Sheets

HYBRID VEHICLE

FIELD OF THE INVENTION

The present invention relates to a hybrid vehicle incorporating both an electric power-generating means and electric storage facilities.

BACKGROUND OF THE INVENTION

Electric vehicles which use secondary batteries such as lead-acid batteries have attracted attention as pollution-free vehicles because they produce no emissions. Electric vehicles of this kind have been already put into practical use in restricted applications such as motor scooters and maintenance vehicles employed on the premises. However, the present situation is that the performance of secondary batteries is not so high that the power sources of general passenger's cars, buses, and trucks cannot fully depend on secondary batteries. As a consequence, electric vehicles are not made practical in these applications.

Accordingly, hybrid vehicles using both an internal combustion engine and electric storage facilities employing secondary batteries have been developed. Hybrid vehicles ranging from prototype versions to practical versions have been announced. Examples include: HX-3 (using both a 40-KW gasoline engine and secondary batteries) manufactured by General Motors, U.S.A.; Tico (using both a 2-cylinder gasoline or diesel engine and Ni—Cd batteries) manufactured by Volkswagenwerk A.G.; and Panda Bimodale (using both a diesel engine and secondary batteries) manufactured by Fiat, Italy.

Hybrid vehicles are classified into two major categories: parallel hybrid system and series hybrid system. The parallel hybrid system is equipped with both an internal combustion engine and an electric motor. The wheels are driven mainly by power obtained from the internal combustion engine. The motor assists the engine in driving the wheels. The motor receives electric power from a storage battery only in peak load conditions as encountered when the vehicle is started, accelerated, or climbing hills. The motor then produces a driving force that assists the driving force produced by the internal combustion engine.

In the series hybrid system, an internal combustion engine drives only a generator. Electric power generated by the generator is once stored in secondary batteries and then supplied to an electric motor, which drives the wheels.

In the series hybrid system, the burden imposed on the internal combustion engine is alleviated and so the amount of emission is reduced compared with the amount of emission produced by conventional vehicles. Furthermore, it is easier to clean the exhaust gas.

In the series hybrid system, the internal combustion engine is required to be kept run at a constant speed to continuously recharge the secondary batteries. Therefore, it is easier to clean the exhaust gas than the parallel system. Moreover, only an internal combustion engine of a small output is necessary. This leads to an emission reduction. Since a hybrid vehicle uses secondary batteries as battery storage devices, the vehicle has some problems.

The greatest problem is that it is necessary to mount secondary batteries of a large capacity which is heavy and has a large volume. This originates in characteristics of secondary batteries regarding cycle life and charging speed. Secondary batteries have a short cycle life. To cope with such short cycle life, it is necessary to set the depth of discharge to a low value, for example, 5%. This means that the electric power usable from the secondary batteries is small compared with the electric power stored.

Further, since charging speed of secondary batteries is relatively low to avoid excessive generation of heat, the compensation rate by charging for expended electric power during driving is also low. For these reasons, it is necessary to mount secondary batteries of a large capacity.

Secondly, the output power from secondary batteries tends to decrease at temperatures below 020 C. Consequently, the range of operating temperatures is narrow.

Thirdly, electric power produced during regenerative braking cannot be effectively recovered. As a result, the kinetic energy of the vehicle is utilized at a low efficiency. More specifically, when the secondary batteries should be recharged, they cannot be recharged with large currents. Therefore, regenerative electric energy exceeding the recharging performance is converted into thermal energy by resistors and discarded.

SUMMARY OF THE INVENTION

It is an object of the present invention to provide a practical hybrid vehicle which is equipped with electric double layer capacitors acting as storage batteries and which is also equipped with an electric power-generating means to recharge the capacitors to prevent the storage batteries from becoming heavy.

It is another object of the invention to provide a hybrid vehicle which can be used over a wider range of temperatures than heretofore.

It is a further object of the invention to provide a hybrid vehicle which can use energy at a high efficiency.

It is a yet other object of the invention to provide a hybrid vehicle which can provide lower emissions.

In order to achieve these objects, a hybrid vehicle according to the present invention comprises an electric power-generating means, electric double layer capacitors, an electric charger, and an electric motor for driving the wheels. Electric power produced by the electric power-generating means is supplied to the electric double layer capacitors via the charger to recharge the capacitors. The motor is driven by the electric power supplied from the electric double layer capacitors.

In this case, the electric power-generating means can be an internal combustion engine or fuel cell. Examples of the internal combustion engines include gasoline engines, diesel engines, gas turbines, reciprocating engines using propane gas or LNG as their fuels, and reciprocating alcohol engines.

In the present invention, it is desired to use electric double layer capacitors having an energy capacity of more than 50 Wh, more preferably more than 1 kWh.

In the novel structure described above, electric power delivered from the electric power-generating means is supplied to the large-capacity electric double layer capacitors via the charger. As a result, the capacitors are quickly recharged efficiently. Electric power stored in the capacitors drives the motor, which is designed to drive the wheels.

Unlike secondary batteries, electric double layer capacitors can, in principle, make use of almost 100% of the stored electric power. That is, 100% discharging depth can be accomplished. The terminal voltage can be varied from 100% to 0% of the voltage which creates a fully charged state. In practice, considering the electronic circuit for taking out electric power stored in the capacitors, the range of used terminal voltages lies from 100% to 50–25%, for example.

If electric power is taken from the capacitors so that the terminal voltage decreases from 100% to 50%, then it follows that 75% [=(1−0.5²)×100] of the power providing a fully charged state is utilized. Similarly, if electric power is taken from the capacitors so that the terminal voltage decreases from 100% to 25%, then it follows that about 94% [=(1−0.25²)×100] of the power providing a fully charged state is utilized.

Furthermore, electric double layer capacitors can be so quickly recharged that electric double layer capacitors under a fully discharged state can be fully charged in 0.5 to 1.5 minutes. In this way, stored electric power can be used at a high efficiency. Moreover, the expended electric power can be supplemented at a high speed. Therefore, capacitors having a smaller capacity than that of secondary batteries can be used. Consequently, it is easy to obtain decreased weight and volume.

Additionally, electric double layer capacitors can be recharged more than ten thousand times, which is more than 10 times as high as secondary batteries. Hence, it is not necessary to replace electric double layer capacitors after short-term use.

Further, the output power from electric double layer capacitors does not drop so much even at low temperatures. Consequently, electric double layer capacitors can be used over an extended range of temperatures.

In addition, quick recharging is possible as described above. Hence, electric power produced only for a short time when regenerative braking is provided can be efficiently recovered.

Other objects and features of the invention will appear in the course of the description thereof, which follows.

DETAILED DESCRIPTION OF THE INVENTION

Figure 1:
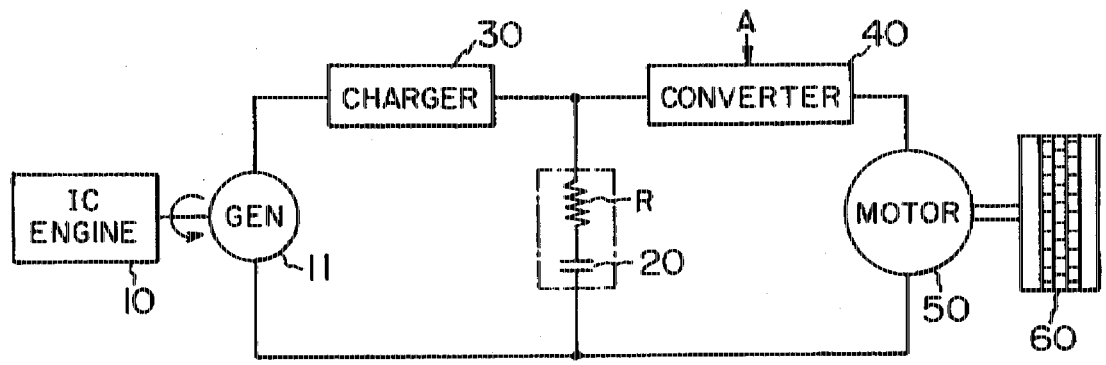
FIG. 1 is a block diagram of a driving system installed in a hybrid vehicle according to the present invention.

Referring to FIG. 1, a driving system installed in a hybrid vehicle according to the present invention is schematically shown. This driving system is of the series hybrid construction, and comprises a generator 11 powered by an internal combustion engine 10 and large-capacity electric double layer capacitors 20 (only one is shown in FIG. 1). These capacitors 20 have an internal resistance R.

For example, the generator 11 consists of a dc generator. DC power generated by the generator 11 is supplied to the electric double layer capacitors 20 via an electric charger 30 having a constant-current characteristic to recharge the capacitors. The charger 30 can consist chiefly of a current-output type switching regulator. Electric power stored in the electric double layer capacitors 20 is supplied via an output converter 40 to an electric motor 50 which drives wheels 60.

Generally, gasoline engines and diesel engines are used as internal combustion engines. Besides, gas turbines and reciprocating engines using propane gas, LNG (liquefied natural gas), and alcohols as fuels can be employed.

The internal combustion engine 10 is run at a constant rotational speed so that the rotational speed of the generator 11 can be maintained at a value which results in the highest power generation efficiency. Therefore, where a diesel engine is used, the amount of black smoke which is said to increase during acceleration and deceleration is suppressed. At the same time, it is possible to make an effective use of good fuel economy which is one feature of the diesel engine.

Where a ceramic gas turbine is used, the vehicle can be made smaller and lighter. Also, a high efficiency is obtained. Furthermore, various liquid fuels such as ethanol can be used.

Preferably, electric double layer capacitors which have relatively high or medium output densities but their internal resistance R is not decreased greatly are used. The resistance per unit capacitance (1 farad) is set to 5–10Ω or more. Instead, emphasis is placed on the energy density.

The electric charger 30 receives dc electric power generated by the generator 11 and charges the electric double layer capacitors 20 with a constant current. During this charging, the charger 30 monitors the voltage developed across the terminals of each capacitor and controls the charging current in such a way that the monitored voltage is maintained at a preset voltage. For example, if the monitored voltage across the terminals exceeds the preset voltage, then the charging is stopped. If the voltage across the terminals decreases below the preset voltage because the electric power is consumed by the motor, then the charging is restarted. During the period charging is stopped, the internal combustion engine 10 can be stopped or run idle based on a control signal from the charger 30 for saving fuel and minimizing noises.

Instead of such ON-OFF control of charging current by the charger 30, proportional control can be introduced.

The output converter 40 supplies appropriate electric power to the motor 50 in response to an Accelerate instruction A. To make the supply of electric power efficient, the output converter 40 preferably has electric power-switching devices to control the electric power supplied to the motor 50 by pulse width modulation. Since the voltage developed across the terminals of the electric double layer capacitor varies greatly according to the depth of discharge as described above, it is necessary to take account of the terminal voltage obtained at every instant in controlling the supplied electric power. More specifically, the required electric power is determined according to the Accelerate instruction A which comes from the accelerator pedal, for example. In order to take the required electric power from the electric double layer capacitors, the output converter 40 appropriately adjusts the pulse width according to the terminal voltage. For example, when the required electric power is large and the terminal voltage is low, the output converter 40 sets the pulse width to a sufficiently large value. When the required electric power is large and the terminal voltage is high, the pulse width is set to a smaller value.

Preferably, a bidirectional type cited in Japanese Patent application Ser. No. 225207/1993 filed by the present applicant is used as the output converter 40. If this directional converter is used, electric power produced by the motor 50 during regenerative braking can be supplied to the electric double layer capacitors 20 via the converter. As a consequence, the electric power can be recovered.

Figure 2:
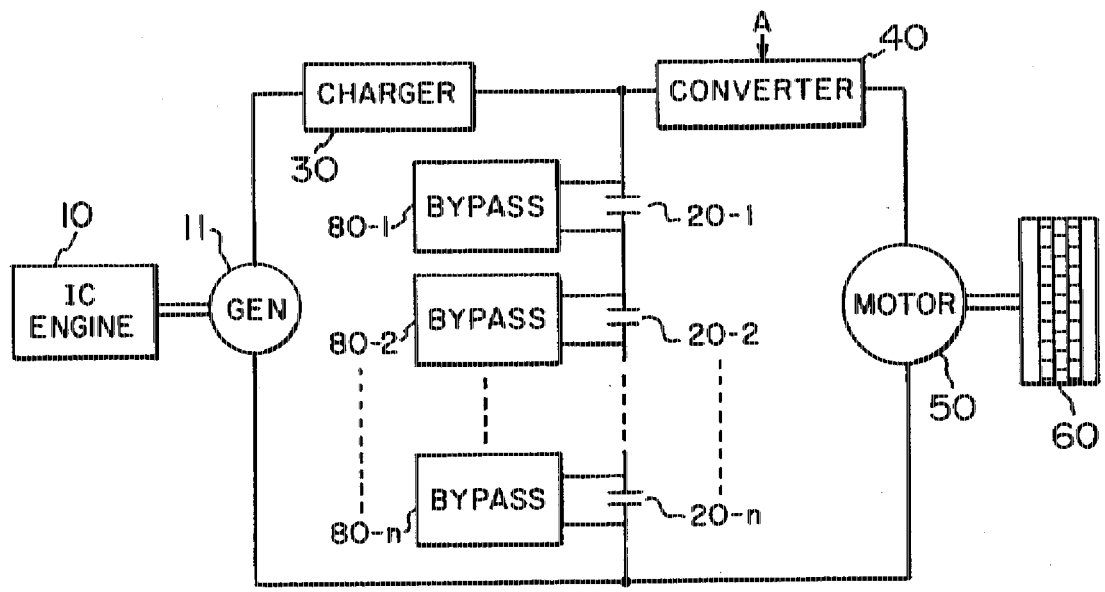
FIG. 2 is a circuit diagram of electric double layer capacitors 20 included in the driving system shown in FIG. 1.

FIG. 2 particularly shows the electric double layer capacitors 20 of the driving system shown in FIG. 1. It is to be noted the like components are indicated by like reference numerals in various figures. The electric double layer capacitors 20 comprise n large-capacity electric double layer capacitors, 20-1 to 20-n, which are connected in series. Voltage-equalizing means, 80-1 to 80-n, are connected in parallel with the electric double layer capacitors, 20-1 to 20-n, respectively.

Figure 3:
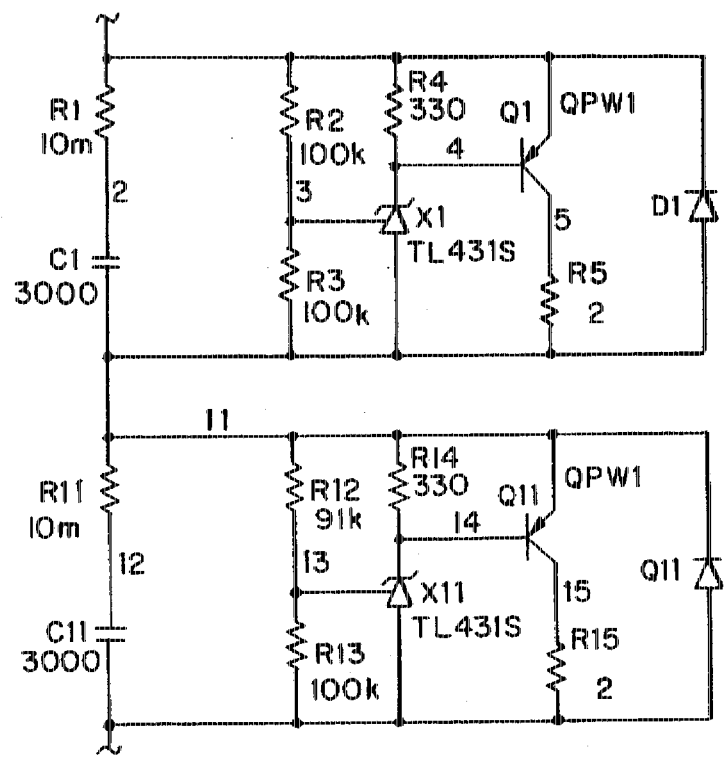
FIG. 3 is a circuit diagram of one example of the voltage-equalizing means shown in FIG. 2.

FIG. 3 is a circuit diagram of one example of these voltage-equalizing means. Each voltage-equalizing means essentially consists of a charge-limiting circuit and is connected in parallel with the corresponding electric double layer capacitor C1. The charge-limiting circuit comprises a three-terminal shunt regulator X1 consisting of an IC, a transistor Q1, a Schottky diode D1, and resistors R2–R5. When the capacitor C1 is electrically charged from the charger 30 and becomes fully charged, the charge-limiting circuit causes the current to bypass the capacitor.

The voltage-equalizing means are not limited to the example shown in FIG. 3. Any desired circuits may be used as long as they are connected in parallel with electric double layer capacitors which are connected in series and the circuits act to equalize the charging voltages for the individual capacitors. For example, the voltage-equalizing means can merely consist of resistors.

Figure 4:
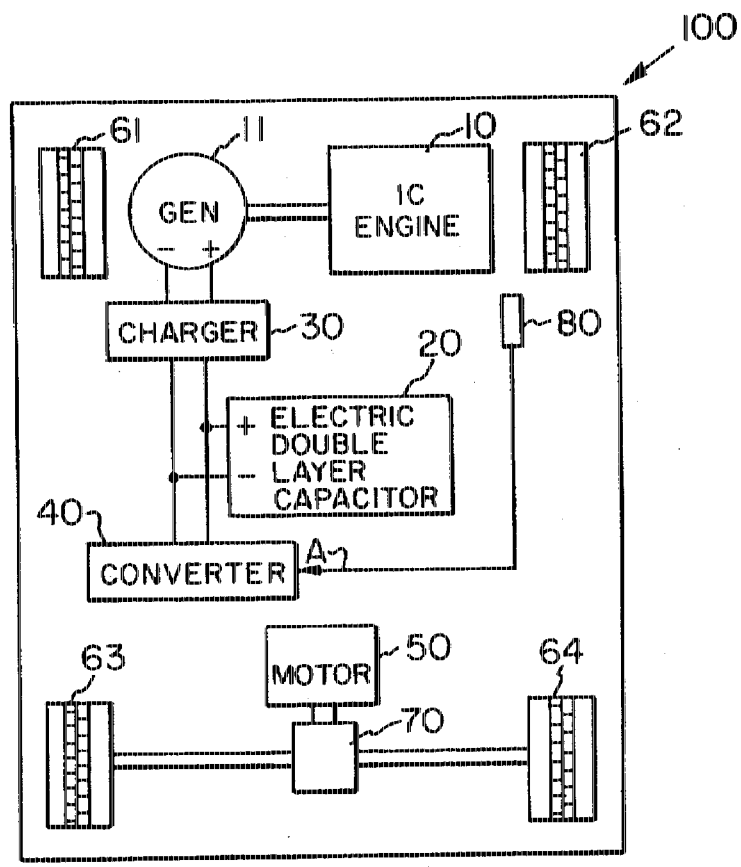
FIG. 4 is a block diagram of a hybrid vehicle on which the driving system shown in FIG. 1 is mounted.

FIG. 4 schematically shows the whole construction of a hybrid vehicle on which the driving system shown in FIG. 1 is mounted. The hybrid vehicle, generally indicated by reference numeral 100, has front wheels 61, 62 and rear wheels 63, 64. Driving force produced by a motor 50 is transmitted to the rear wheels 63 and 64 via a differential 70. An output converter 40 controls the pulse width, depending on the Accelerate instruction A supplied from the accelerator pedal 80 and also on the voltage developed across the terminals of an electric double layer capacitor 20, the voltage varying from instant to instant. Appropriate electric power is taken from the electric double layer capacitor 20 and supplied to the motor 50. Examples of performance that each component of the novel hybrid vehicle must exhibit are given and discussed below.

EXAMPLE 1 OF DESIGN total weight of vehicle: 1,000 kg rated output of motor: 20 kW capacity of electric double layer capacitor: 3.3 kWh rated output of generator: 5.4 to 10 horsepower In the light of a known electric vehicle having a total weight of 1,000 kg, the rating of the motor 50 is set to 20 kW. Assuming that the rated output of the electric double layer capacitor 20 can be maintained for 10 minutes, the capacity that the electric double layer capacitor 20 must have is calculated at 3.3 kWh. Let us assume that the energy density of the capacitor is 25 Wh/L and that the specific gravity is 1.2. Calculations show that the electric double layer capacitor 20 has a volume of 134 liters and a weight of about 160 kg.

It is assumed that the electric double layer capacitor 20 is in an unloaded, fully discharged state. If it is necessary that this electric double layer capacitor 20 be charged fully within 50 minutes, then the capacity of the generator 11 is $$(3.3\ kWh/(50/60)h)=4\ kW.$$

This corresponds to about 5.4 horsepower. If the loss in the generator 11 and losses produced in electronic circuits such as the charger 30 are taken into account, then the rated output power that the internal combustion engine 10 driving the generator must exhibit is 1.2 times as large as 5.4 horsepower, i.e., about 6.5 horsepower.

On highways, the vehicle may cruise at a high average cruise speed. Considering these situations, further allowances are given. Therefore, the rated output power is set power of the internal combustion engine 10 driving the generator 11 is only about one tenth of the output power of an ordinary internal combustion engine mounted on a conventional automobile.

Obviously, the engine of such low output power achieves greatly reduced emissions. Furthermore, the engine exhaust gas can be easily cleaned because the internal combustion engine 10 is kept run at a constant rotational speed.

EXAMPLE 2 OF DESIGN total weight of vehicle: 1,000 kg rated output of motor: 20 kW capacity of electric double layer capacitor: 1 kWh rated output of generator: 20 horsepower In the trial calculations about Example 1 of design, the capacity of the electric double layer capacitor 20 is so set that the rated output of the motor 50 can be maintained for 10 minutes. This time can be made shorter. In particular, when the vehicle should be driven, the motor that drives the vehicle is required to deliver its maximum or near maximum output power during acceleration. However, when the vehicle is going at a constant speed, the required output power is much smaller.

European researches on automobile run patterns have revealed that in an average mode of use, the period (acceleration period) for which the output power of the motor must be in excess of the time-averaged value (average horsepower) of the output of the motor is about three minutes. If the aforementioned persistence time of 10 minutes is shortened to 3 minutes according to this result, then the capacity that the electric double layer capacitor 20 must have is 1 kW, which is about one third of 3.3 kW. Assuming that the energy density of the capacitor is 25 Wh/L and that the specific gravity is 1.2, the volume and the weight of the electric double layer capacitor 20 are calculated at about 40 liters and about 50 kg, respectively. This is comparable to the volume of a fuel tank built into the existing automobile.

Where the volume of the electric double layer capacitor is set to a small value in this way, the vehicle is preferably equipped with a generator of about 20 horsepower (=15 kW) to prevent the cruise speed from decreasing, provided that the total weight of the vehicle is 1000 kg.

In the above-described Example 2 of design, the maximum electric power supplied from the electric double layer capacitor 20 is 20 kW, which is just equal to the rated output of the motor 50. This state is maintained for 3 minutes. We consider that the rated output of the motor is a continuous rated output. If a decrease in the persistence time is taken into consideration, it is easy to make the peak output power from the electric double layer capacitor 20 about three times as large as the continuous rated output. Taking these considerations into account, the maximum ratings of the electric double layer capacitor 20, the output converter 40, and the motor 50 are designed. As a result, quick acceleration is obtained by supplying electric power of 60 Kw into the motor 50 for 1 minute. Also, when the vehicle is stalled under a heavy-load condition, a force enabling the vehicle to escape from this state can be obtained on an emergency basis.

In practical applications, it is desired to set the electrostatic capacitance of the electric double layer capacitor 20 greater than the values used in Examples 1 and 2 of design. Also, it is preferable to set the maximum allowable voltage of the charger 30 slightly lower than the rated voltage of the electric double layer capacitor. In this scheme, even if the electric double layer capacitor 20 is charged up to the maximum allowable voltage by the charger 30, then electric power produced during regenerative braking can be forced back into the electric double layer capacitor 20 until the voltage developed across the terminals of the electric double layer capacitor increases up to its rated voltage from the maximum allowable voltage.

In the above examples, a generator and an internal combustion engine for driving the generator are used as electric power-generating means. The electric power-generating means is not limited to this example. For instance, fuel batteries using methanol as their fuel and solar batteries can be used as the electric power-generating means.

The examples shown in FIGS. 1-4 pertain to a series hybrid vehicle. The invention can also be applied to a series hybrid vehicle. For example, the series hybrid vehicle shown in FIG. 4 can be changed into a parallel hybrid vehicle by connecting the output shaft of the internal combustion engine 10 with the differential 70 and coupling the output of the motor to the output shaft of this internal combustion engine.

What is claimed is:

1. A hybrid vehicle having wheels, comprising:
   an electric power-generating means for producing electric power;
   electric double layer capacitors to which said electric power produced by said electric power-generating means is supplied via an electric charger to recharge said electric double layer capacitors; and
   an electric motor for driving the wheels, said electric motor being driven by electric power supplied from said electric double layer capacitors.

2. The hybrid vehicle of claim 1, wherein said electric double layer capacitors are connected in series, and wherein voltage-equalizing means are connected in parallel with said electric double layer capacitors, respectively.

3. The hybrid vehicle of claim 2, wherein said voltage-equalizing means are equipped with bypass means to cause a charging current for recharging said electric double layer capacitors to bypass said capacitors when a voltage developed across terminals of each electric double layer capacitor exceeds a given voltage.

4. The hybrid vehicle of claim 1, wherein said charger is a switching converter having a constant-current characteristic and a limited-voltage characteristic.

5. The hybrid vehicle of any one of claims 1 to 4, wherein said electric power-generating means is a generator driven by an internal combustion engine.

6. The hybrid vehicle of claim 5, wherein said internal combustion engine is a gasoline engine.

7. The hybrid vehicle of claim 5, wherein said internal combustion engine is a diesel engine.

8. The hybrid vehicle of claim 5, wherein said internal combustion engine is a gas turbine.

9. The hybrid vehicle of claim 5, wherein said internal combustion engine is a reciprocating engine using propane gas or LNG as its fuel.

10. The hybrid vehicle of claim 5, wherein said internal combustion engine is a reciprocating alcohol engine.

11. The hybrid vehicle of claim 5, further comprising a driving force-transmitting means for transmitting driving force produced by said internal combustion engine to said wheels.

12. The hybrid vehicle of claim 11, wherein said internal combustion engine is a gasoline engine.

13. The hybrid vehicle of claim 11, wherein said internal combustion engine is a diesel engine.

14. The hybrid vehicle of claim 11, wherein said internal combustion engine is a gas turbine.

15. The hybrid vehicle of claim 11, wherein said internal combustion engine is a reciprocating engine using propane gas or LNG as its fuel.

16. The hybrid vehicle of claim 11, wherein said internal combustion engine is a reciprocating alcohol engine.

17. The hybrid vehicle of any one of claims 1 to 4, wherein said electric power-generating means is a fuel cell.

* * * * *